Jan. 10, 1967 W. R. FENZAN 3,296,665
CUT-OFF FOR SPLIT MOLD
Filed Oct. 29, 1963 3 Sheets-Sheet 1
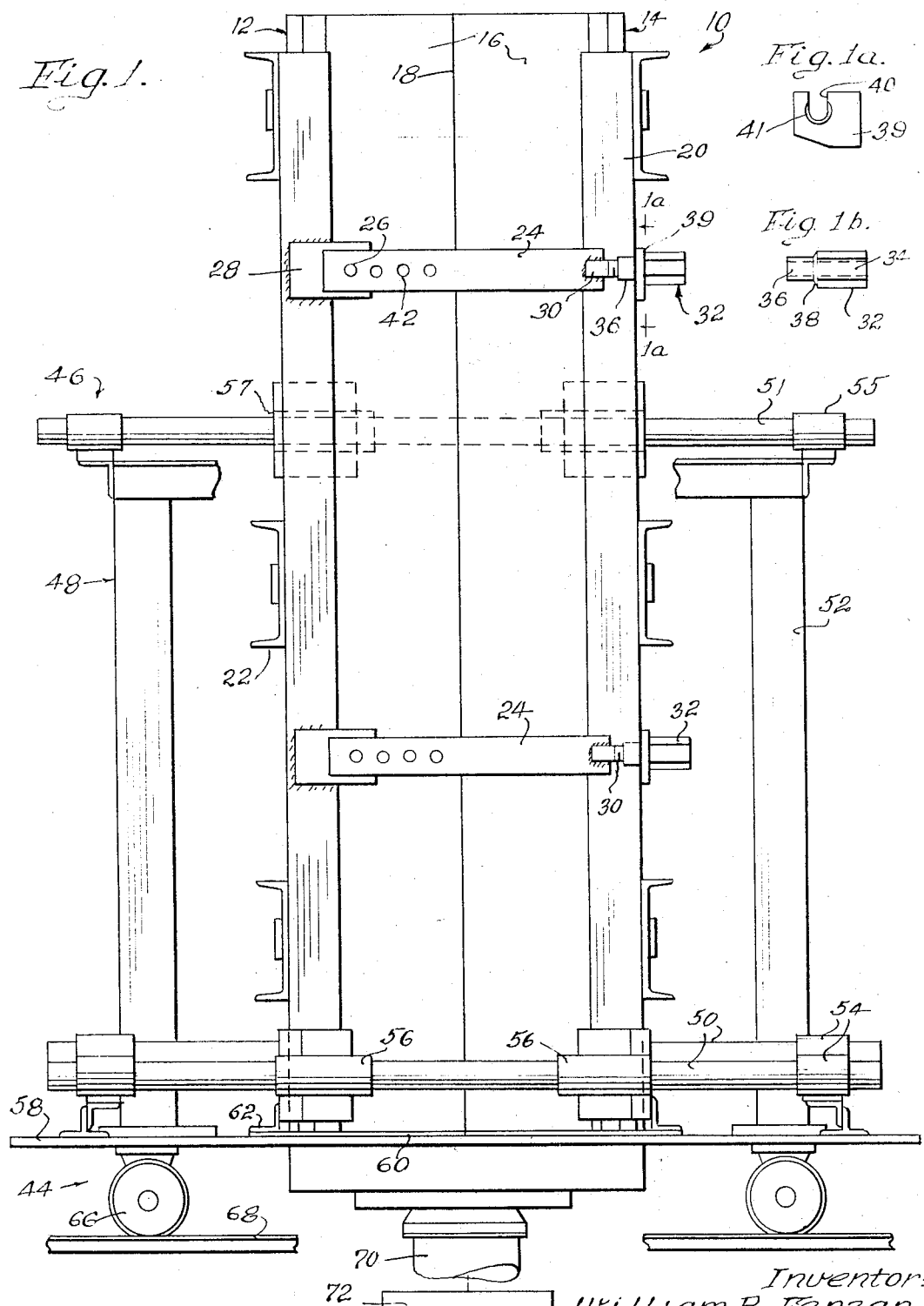

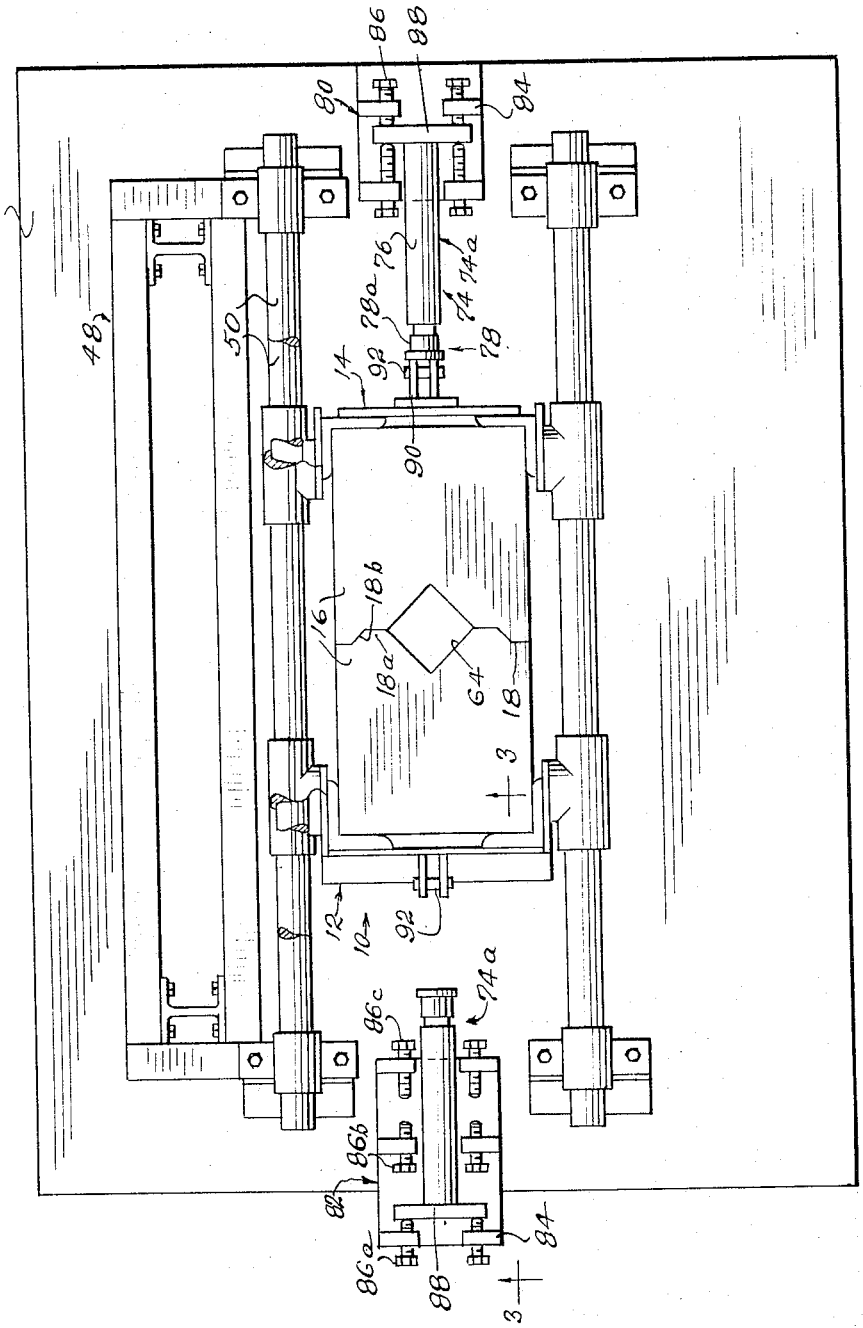

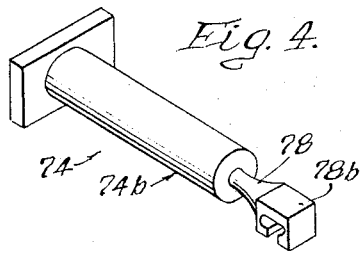
Fig. 4.
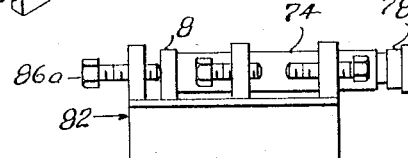
Fig. 3.
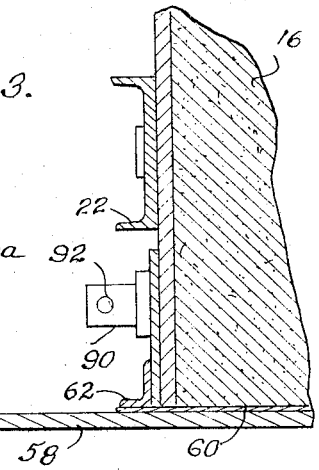
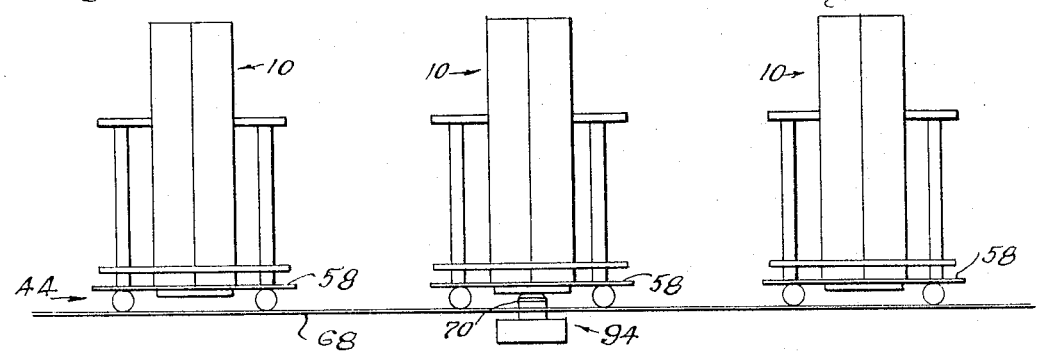
Fig. 5. — Plurality of cars
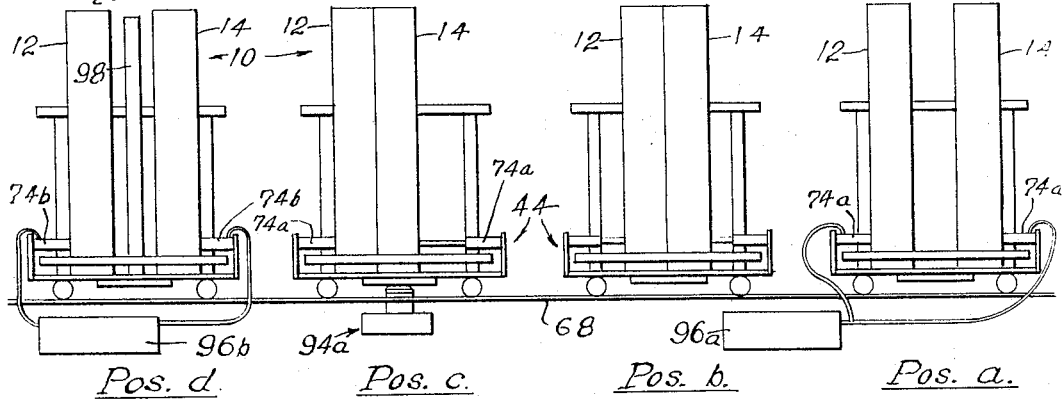
Fig. 6. — Same car — Different positions
Inventor:
William R. Fenzan

United States Patent Office 3,296,665
Patented Jan. 10, 1967

3,296,665
CUT-OFF FOR SPLIT MOLD
William R. Fenzan, Oak Lawn, Ill., assignor to Amsted Industries Incorporated, Chicago, Ill., a corporation of New Jersey
Filed Oct. 29, 1963, Ser. No. 319,722
5 Claims. (Cl. 22—75)

This invention relates to molds for pressure casting and a method of casting in connection therewith.

The invention relates particularly to upright molds mounted on cars and moving into and past a pouring station at which the molds are filled, each mold being made of separable parts, the invention also including power means for moving the mold parts into and out of operative engagement.

A principal object of the invention is to provide mold means of the foregoing general character which is highly portable.

Another object of the invention is the attainment of great economy in that a small number of power means will suffice, the same power means being utilized in connection with all of the molds which may be of a large number.

Another object is to provide mold means of the foregoing character which, because of the portability thereof, is maintained on a movable means, such as a car, and which includes sealing means for preventing escape of molten metal through spaces between the mold and the car.

Still another object is to provide molds of the foregoing character and novel means which hold down the molds and provide solid support of the molds on the cars.

Other objects include provision of novel method steps including, for example, a time delay interposed between termination of the filling operation and the shut-off of the mold from the pouring tube.

Other objects and advantages of the invention will appear in the following detailed description taken in conjunction with the following drawings in which:

FIGURE 1 is a side elevational view of a mold assembly including the car for carrying the mold along the intended path;

FIGURE 1a is a detail view taken at line 1a—1a of FIGURE 1;

FIGURE 1b is a detail view of a clamp nut used in clamping the parts of the mold of FIGURE 1;

FIGURE 2 is a top view of the assembly of FIGURE 1;

FIGURE 3 is a fragmentary sectional view taken at line 3—3 of FIGURE 2;

FIGURE 4 is a perspective view of one form of power means for moving the mold on the car;

FIGURE 5 is a diagrammatic view of a plurality of mold assemblies in respective positions assumed in successive movement along a track; and FIGURE 6 is a diagrammatic view illustrating one mold assembly in different positions along a track, showing the relative positions of the mold blocks on the car in the different positions of the assembly.

Referring now in detail to the drawings, attention is directed first to FIGURES 1 and 2 showing the mold of the invention in its entirety, and in the assembly in which it is incorporated, including a car for supporting the mold as well as framework for supporting the mold parts in proper position on the car. The mold is indicated in its entirety at 10 and it includes two main separable parts 12 and 14 movable into and out of operative inter-engagement. FIGURES 1 and 2 show these parts in such engagement while FIGURE 6 shows the mold parts separated in two of the positions thereof as will be described in detail herein below. Each mold part 12, 14 includes a graphite block 16, the parting line between which is indicated at 18, the arrangement preferably including male and female elements, 18a and 18b respectively (FIG. 2), to facilitate registering the mold parts. Each graphite block is mounted in a framework including a pair of vertical angle irons 20, these four angle irons being disposed at the respective corners of the mold. Suitable conformations are made in the block 16 and frame angle irons 20 to provide for differential expansion therebetween. The two angle irons of each mold part are interconnected by suitable means, such as cross-pieces 22 secured thereto as by welding. The mold parts 12, 14 are securely held together in assembled position for a pouring operation by clamp arms 24 which may be of any suitable number, such as two on each side of the mold. These clamp arms are pivoted on pins 26 mounted on plates 28 secured to the angle irons 20 at one side, and their swinging ends have latching engagement with the opposite frame angle irons 20. Secured to the swinging end is a threaded rod 30 on which is threaded a clamp nut 32, including a large outer polygonal portion 34, a smaller inner tubular portion 36 and a chamfer 38 therebetween (FIG. 1b). A clamp bracket 39 is secured to the adjacent angle iron 20 (FIG. 1a) having an upwardly opening notch 40 around the lower end of which is a chamfer 41. The arm is latched by swinging its free end into the notch 40, after having loosened the nut if it was not loose, and then tightening the nut; the chamfer 38 on the nut thereupon engages in the chamfer on the bracket, and a positive clamping action is provided. An additional advantage of this arrangement is that compensation is provided, for reduction in dimension of the graphite blocks which are resurfaced after wear or damage has occurred. If desired, the arms 24 may be provided with a plurality of apertures 42 selectively receiving the pins 26 for making similar adjustment.

The mold 10 illustrated herein is designed for casting relatively long billets and, as such, is of relatively tall proportions. The mold is arranged for sliding movement along the surface of the car 44 on which it is supported and to maintain the mold in proper position thereon during such sliding movements, a framework indicated in its entirety at 46 is provided. This framework includes an upright frame structure 48 and lower support bars 50 mounted therein on opposite sides of the mold. The frame structure includes a plurality of upright members 52 of suitable form and dimensions which may be four in number, and an additional support bar 51 is provided on one side of the mold, adjacent the upper portion of the mold. The support bar 51 retains the mold against tipping while the lower support bars 50 perform the additional function of holding the mold down tightly on the car deck. These support bars are mounted in bearings or supporting elements 54 and 55 secured to the upright members 52 and are received in tubular bearings 56 and 57 mounted on the angle irons 20 of the mold parts.

The upright members 52 are positioned apart longitudinally of the car and the support bars 50 and 51 are of sufficient length to enable the assembled mold to be moved bodily along the car, and in separate movements, in which the mold parts are separated to remove the article cast therein. The lower support bars 50 are located at appropriate height, and are of such characteristics as to hold the mold parts against the car deck with proper pressure at all locations of the mold parts.

The car 44 includes a top supporting deck 58 having a plane upper surface upon which the mold is supported. The mold assembly includes a heat sink 60 in the form of a plate, made up of separable parts, interposed between the mold and the car deck 58. This plate is of high heat conductivity and preferably is of copper which possesses a substantially higher degree of heat conductivity than the graphite blocks of the mold. The parts of this plate 60 are secured to the respective mold parts by suitable means such as angles 62 secured to the plate parts and respective elements of the angles 20.

The plate 60 has an opening in register with and correspondingly shaped and dimensioned to the aperture of the mold which is indicated at 64 in FIGURE 2, the shape of which is of course determined by the intended shape of the cast article.

The car 44 includes wheels 66 riding on tracks 68. A pouring station is indicated at FIGURE 1 in which a pouring tube 70 is positioned for pouring into the mold, the pouring tube being connected with a pressure casting ladle indicated diagrammatically at 72.

The power means for moving the mold, referred to above, are illustrated best in FIGURES 2, 3 and 4, and preferably are hydraulic ram type devices indicated at 74 and each of which includes a cylinder 76 and a piston 78. The ram means are of two different types, one of which, 74a, shown in FIGURE 2, is of the pusher type, while the other 74b, shown in FIGURE 4, is of the puller type. In the ram means 74a the piston 78 has a head 78a which merely loosely engages the mold for pushing it, while in the other ram, 74b, the piston 78 has a head 78b which includes a hook for hooking on a cooperating element on the mold for pulling the mold or mold part.

The ram means are detachably mounted in the mold assembly in cradle means 80 and 82 mounted on the car. The cradle 80 includes brackets 84 having set screws 86 therein respectively engageable with opposite surfaces of a base plate 88 of the ram means. The ram means (e.g. at the right hand end of FIG. 2) is put in position by inserting the base plate 88 between opposed set screws with the piston 78 directed for engaging the mold and so engaging the mold when the piston is extended. The mold frame includes an adapter 90 having a pin 92 therein for adapting the puller type ram means (FIG. 4) but the adapter also serves as a means through which the pusher type piston can engage the mold.

At the other end of the mold assembly (left end, FIG. 2) the cradle 82 includes additional brackets 84 for adapting both types of rams, namely 74a of FIGURE 2 or 74b of FIGURE 4. In the case of the ram 74a, the base plate 88 is butted against the outer set screws 86. This cradle 82 is particularly adapted for accommodating the puller ram 74b in the use of which the base plate 88 thereof is positioned between opposed set screws 86b and 86c, and the hook 78b is hooked over the pin 92 and thus in position for pulling the mold or the corresponding mold part.

FIGURE 5 shows a succession of mold assemblies and cars. These cars and mold assemblies are moved along the track 68 by suitable power means (not shown) to a pouring station indicated at 94, over and in register with the pouring tube 70. After each mold is filled, the car is moved along the track to the position at the left hand end of FIGURE 5 and another one brought into pouring position.

FIGURE 6 illustrates a plurality of positions of a single car and mold. In connection with FIGURE 6, it may be assumed that a pouring station is at about the point 94a and the car mold moves from right to left. In position a the mold parts are separated pursuant to removing the cast article after a previous casting operation. A pair of ram means 74a operated by suitable power means 96a, are located at a position a and when the mold assembly reaches that position, these rams are put in position in the assembly as described above. Upon actuation and consequent extension of the rams, the mold parts are moved together by the pusher rams 74a to the position shown in position b after which the clamping arms 24 (FIGURE 1) are swung into clamping position shown in that figure.

The car is then removed to the pouring position, position c, if it is not at that time so positioned, and the pouring operation is performed. After completion of the pouring operation (see also below) a pusher ram 74a is actuated, for example, as indicated in position c, with the mold parts remaining clamped together, whereupon the mold as a whole is forced out of registry with the pouring opening through the car, cutting off the mold from the pouring tube. It will be understood that the mold parts may be moved into inter-engagement before the mold assembly reaches the pouring station or while it is at it, placing the cavity in the mold in register with the pouring tube. Thus, the same single pair of rams 74a, at a fixed location, are utilized in each and all of the first three positions, a, b, and c.

After the mold is moved to cut-off position, on the car, shown in position c, the mold is permitted to cool. For this purpose, the ram 74a is detached from the mold and the latter is then moved out of pouring position, to enable another mold to be moved into the pouring station during the relatively longer period required for cooling of previously poured mold. This latter position is indicated at position d. After the mold is cooled the desired extent, a second pair of rams are applied to the car, in this case rams 74b are hooked on the respective pins 92 and, upon operation of the power means 96b the rams are contracted, resulting in separation of the mold parts after having first unlatched the clamping arms 24 (FIGURE 1). The cast article 98 thus produced is shown at 98 in FIGURE 6, at position d. These latter ram means 74b as stated above are detachably mounted on the car and thus a single pair of such rams at a fixed location will suffice for separating all of the molds.

The metallic heat sink plate 60 serves as a means for quickly freezing the molten metal in engagement therewith and this feature together with the solid hold-down of the mold by the hold down bars 50 prevents the formation of fins between the mold and plate and between the plate and the car deck 58. The secure holding down which includes maintaining the mold in accurate position notwithstanding its relatively great height, and preventing any tipping or tilting thereof, aids in preventing any fins forming or running out occuring at the points mentioned.

The cut-off movement of the mold need be no greater than the maximum dimension of the mold cavity in the direction of the movement. The movement of the mold should be as smooth and continuous as possible, this being accomplished by the effective holding down of the mold and smooth and continuous movement of the pistons which preferably is on the order of six inches per second. Movement at a faster rate may tend to produce an erratic movement while movement at a slower rate may enable a binding action to take place at the plane of shear.

The use of a metallic heat sink plate 60 eliminates any cracking or breaking of the graphite which is relatively weak and brittle as may be the case if such plate were not used.

The method of this invention also preferably incorporates a time delay between termination of the puring operation and the cut-off movement. It has been found that a time delay of on the order of one second is satisfactory. This time delay permits the system to at least partially dissipate the kinetic energy of the rising metal in the pressure system. The force of this kinetic energy could have the effect of running thin sections at the meeting planes of the parts of the mold assembly.

While I have disclosed and claimed herein a certain preferred form of the invention, it will be understood that changes may be made within the scope of the appended claims.

I claim:

1. Mold apparatus of the character disclosed comprising a support having a pouring opening and movable onto and out of a pouring station in which it is disposed over a pouring tube with said pouring opening in register therewith, a pair of mold parts mounted on the support and relatively movable into and out of interengagement and having a cavity formed therebetween when in interengagement, said mold parts being also movable together as a unit into and out of position with said cavity in register with said pouring opening, a bottom plate having greater heat conductivity than the material of the mold parts forming said cavity interposed between the mold and said support, means for holding down said mold parts in tight engagement with said support while enabling the mold parts to be moved along the support, and power means for moving said mold parts individually and moving the mold parts together as a unit.

2. The invention set out in claim 1 wherein the bottom surface of the mold, said plate, and said support are planar and have tight interengagement between respective meeting surfaces, and which includes said hold down means on each of opposite sides for preventing tilting of the mold in any direction and for maintaining firm planar engagement between said planar surfaces throughout their respective areas.

3. The invention set out in claim 2 in which the mold is relatively tall and has relatively small horizontal transverse dimensions, and additional guide means is provided adjacent the top of the mold.

4. The invention set forth in claim 1 wherein said support is a car having wheels riding on tracks, the power means for moving the mold and mold parts includes a pair of power rams at each of two stations, said power rams being separate from the support car and detachably mountable thereon for operative reactive engagement between the support and mold, and said respective parts of power means include one pair for closing the mold parts and another pair for opening the mold parts, and the support car includes cradle means for selectively accommodating both kinds of power means.

5. The invention set out in claim 1 in which the portions of the mold defining said cavity are formed with graphite and said bottom plate is formed of metallic copper.

References Cited by the Examiner
UNITED STATES PATENTS

| | | | |
|---|---|---|---|
| 2,847,739 | 8/1958 | Sylvester | 22—69 |
| 2,967,339 | 1/1961 | Ma et al. | 22—209 |
| 3,015,863 | 1/1962 | Strom et al. | 22—69 |
| 3,032,841 | 5/1962 | Sylvester | 22—69 |
| 3,096,550 | 7/1963 | Greffe et al. | 22—209 |
| 3,189,960 | 6/1965 | Bright | 22—209 |
| 3,196,503 | 7/1965 | Sylvester | 22—69 |

J. SPENCER OVERHOLSER, *Primary Examiner.*

R. S. ANNEAR, *Assistant Examiner.*